Patented Apr. 8, 1930

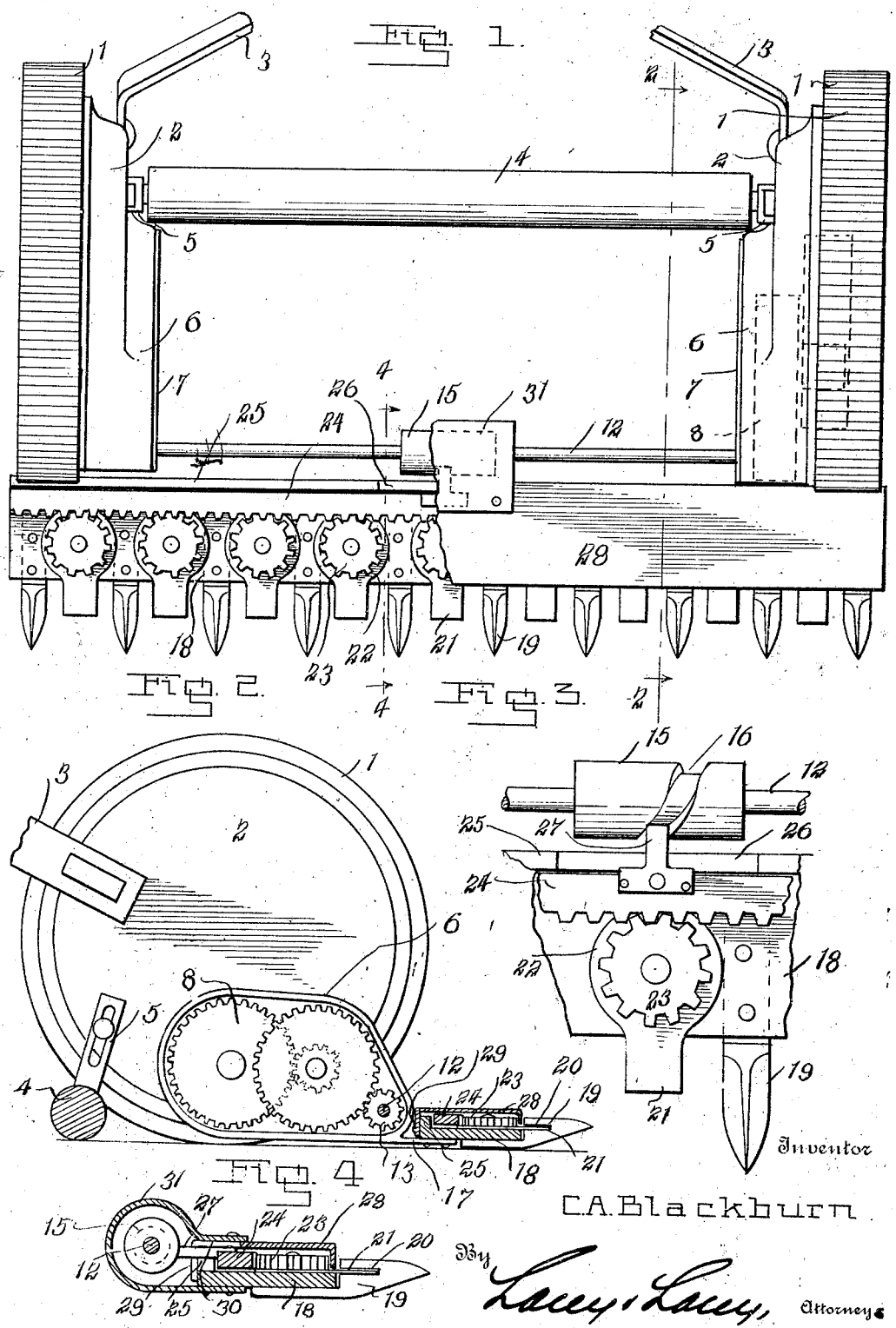

1,754,076

UNITED STATES PATENT OFFICE

CHARLES A. BLACKBURN, OF WASHOUGAL, WASHINGTON, ASSIGNOR TO KEYSTONE MANUFACTURING CO., INC., OF CHEHALIS, WASHINGTON

LAWN MOWER

Application filed January 5, 1928. Serial No. 244,748.

This invention relates to lawn mowers and has for its object the provision of a lawn mower which may be operated close to the side of a building and which, when in operation, will cut through tall grass without beating down the same. The invention seeks particularly to provide a lawn mower in which a plurality of oscillatory knives will be driven from the supporting ground wheels and in which the operating mechanism will be all housed and thereby protected against accumulations of fallen grass and which will be free of complicated arrangements which are apt to get out of order. The invention is illustrated in the accompanying drawing and consists in certain novel features which will be hereinafter first fully described and then more particularly pointed out in the appended claim.

In the drawing:

Figure 1 is a view, partly in plan and partly in horizontal section, of a lawn mower embodying my invention;

Fig. 2 is a vertical section on the line 2—2 of Fig. 1, the gear case cover being removed;

Fig. 3 is an enlarged detail plan view of a portion of the knife-actuating mechanism, and Fig. 4 is an enlarged detail section on the line 4—4 of Fig. 1.

The lawn mower comprises a pair of ground wheels 1, the axles of which are supported in castings constituting gear cases 2, and these castings have rigidly secured thereto the forward ends of braces 3 which converge rearwardly and upwardly and are connected to a handle of the usual construction. A presser roller 4 is carried by brackets 5 which are adjustably secured to the gear cases 2, the roller extending between the gear cases and operating in the usual manner of the presser rollers now customarily provided in all lawn mowers. The gear cases 2 are each enlarged by virtue of offsets 6 on their inner sides at their lower forward portions, the said offsets being open on their inner sides and having cover plates 7 attached thereto to close the openings and prevent the access of dirt and other foreign matter to the gears mounted in the offsets and the casings. The axles of the ground wheels are connected with driving gears through the usual ratchet arrangement common to lawn mowers, and the driving gears, indicated at 8, may be of approved form and arrangement whereby relatively high speed will be imparted to a transverse shaft 12 through pinions 13 secured thereon at the ends thereof. The transverse shaft 12 is journaled in the extreme lower forward portions of the extensions or offsets of the gear casings and extends between the casings, as shown in Fig. 1 and as will be understood. When the machine is pushed over a lawn, the shaft 12 will be rotated, it being understood that the ground wheels 1 are set in motion by their tractive engagement with the ground and the motion of said wheels is transmitted through the indicated gearing. At the center of the shaft 12, there is secured to the same a spool or sleeve 15 having a cam groove 16 formed circumferentially therein. Projecting forwardly from the lower extremities of the gear casings are brackets 17 and extending between and rigidly secured to said brackets, so as to be carried thereby, is a base plate 18 to the under side of which are rigidly secured the rear ends of guard fingers 19 which project forwardly beyond said base plate and extend upwardly in front of the same, these guard fingers being provided with horizontal notches or recesses 20 into which the knives 21 may extend when they are oscillated in the operation of the machine. The knives 21 are substantially rectangular plates sharpened on their side edges and extending forwardly from circular enlargements 22 which rest upon and are pivoted to the base plate 18, as will be understood, and fixed upon the circular enlargements or heads 22 of the respective knives are pinions 23 which mesh with a rack bar 24 arranged at the rear of the pinions and meshing with the entire series of pinions. The rack bar is guided by a vertical flange 25 at the rear edge of the base plate 18 and at the center of said flange is a recess 26 through which projects a finger or bracket 27 secured rigidly to the rack bar and engaging in the cam groove 16 of the roller 15. It will now be obvious that, when the shaft 12 is rotated, the roller 15 will rotate with the shaft and the groove 16 will act upon the bracket or finger 27 so that the rack bar 24 will be reciprocated. Inasmuch as the rack bar is in mesh with the pinions 23 which are fixed to the heads of the knives 21, the knives will be oscillated and will cut through the blades of grass, forcing the blades of grass against the sides of the guard fingers and then cooperating with the sides of the fingers to make a shear cut through the grass.

A cover plate 28 is arranged over the rack bar and the pinions 23 and is secured to the back edge of the base plate 18, as indicated at 29, the cover being cut away or recessed at its center, as indicated at 30, to accommodate the finger 27 in an obvious manner. A hood or housing 31 is also attached to the cover plate 28 and the base plate 18 and extended around the cam roller 15 so that the cut grass cannot accumulate on said roller and interfere with the action of the same. By referring to Fig. 1, it will be noted that the base plate 18 and the parts associated therewith extend in front of the ground wheels 1 and may project somewhat beyond the outer sides of said wheels so that the machine may be pushed along the side of a building close to the same and cut down the grass immediately adjacent the same without being turned aside by impact of the ground wheels with the wall of the building. It will be noted that the driving mechanism is very simple and compact and is arranged so as to transmit the motion of the ground wheels in a very direct manner to the shaft which actuates the cutters. The guard fingers will run close to the ground and will pick up and straighten any fallen grass which may have been beaten down and all the grass will thereby be changed to upstanding position so that it may be positively engaged and cut by the knives. It will be further noted that there are no parts revolving above the knives which would tend to beat down the grass and prevent the knives properly acting upon the same so that a lawn may be mowed by the use of this machine in a complete clean manner. All the moving parts of the gearing are completely housed so that no fallen grass may accumulate thereon and clog the operation and the compact arrangement of the parts leaves a large clear space between the sides of the machine through which the cut grass may fall while the weight of the machine is less than that of lawn mowers of corresponding size as now generally constructed and, consequently, the machine may be operated for a considerable period without excessive fatigue.

Having thus described the invention, I claim:

A lawn mower comprising a housing consisting of a transversely disposed base plate provided with an upstanding flange along its back edge, a cover plate secured to said flange and projecting forwardly over the base plate and provided with a depending flange along its front edge, a plurality of guard fingers secured to and projecting forwardly from the base plate, a plurality of oscillatory knives mounted upon the base plate under the cover and having their cutting ends projecting forwardly between the base plate and the cover and arranged alternately with the guard fingers, pinions fixed on the respective knives concentric with the pivots thereof, a rack bar disposed between the base plate and the cover and meshing with the pinions and guided by and between the pinions and the flange at the back edge of the base plate, a cam disposed at the rear of the housing and immediately adjacent the same, means for rotating the cam, and a finger secured rigidly to the rack bar and projecting rearwardly therefrom into engagement with the cam, the back of the cover and the back flange of the base plate being recessed centrally to accommodate the finger.

In testimony whereof I affix my signature.

CHARLES A. BLACKBURN. [L. S.]